(12) United States Patent
Achituv et al.

(10) Patent No.: US 11,545,137 B2
(45) Date of Patent: *Jan. 3, 2023

(54) SYSTEM AND METHOD OF AUTOMATED MODEL ADAPTATION

(71) Applicant: Verint Systems Ltd., Herzilya Pituach (IL)

(72) Inventors: Ran Achituv, Hod Hasharon (IL); Omer Ziv, Ramat Gan (IL); Roni Romano, Even Yehuda (IL); Ido Shapira, Tel Aviv (IL); Daniel Baum, Modiin (IL)

(73) Assignee: VERINT SYSTEMS INC., Melville, NY (US)

( * ) Notice: Subject to any disclaimer, the term of this patent is extended or adjusted under 35 U.S.C. 154(b) by 160 days.

This patent is subject to a terminal disclaimer.

(21) Appl. No.: 16/983,550

(22) Filed: Aug. 3, 2020

(65) Prior Publication Data

US 2020/0388272 A1    Dec. 10, 2020

Related U.S. Application Data

(63) Continuation of application No. 15/473,231, filed on Mar. 29, 2017, now Pat. No. 10,733,977, which is a (Continued)

(51) Int. Cl.
| | |
|---|---|
| *G10L 15/26* | (2006.01) |
| *G10L 15/065* | (2013.01) |
| *G06F 16/683* | (2019.01) |
| *G10L 15/07* | (2013.01) |
| *G10L 15/01* | (2013.01) |
| *G10L 15/14* | (2006.01) |
| *G10L 15/08* | (2006.01) |

(52) U.S. Cl.
CPC .......... *G10L 15/065* (2013.01); *G06F 16/685* (2019.01); *G10L 15/01* (2013.01); *G10L 15/07* (2013.01); *G10L 15/14* (2013.01); *G10L 15/26* (2013.01); *G10L 15/083* (2013.01)

(58) Field of Classification Search
CPC ....... G10L 15/065; G10L 15/01; G10L 15/07; G10L 15/14; G10L 15/26; G10L 15/083; F06F 16/685
USPC ..... 704/235, 240, 251, 257, 275, 270, 9, 10, 704/244, 256.5
See application file for complete search history.

(56) References Cited

U.S. PATENT DOCUMENTS

| | | | |
|---|---|---|---|
| 6,173,259 B1 * | 1/2001 | Bijl | ..................... H04M 3/5307 704/235 |
| 6,374,220 B1 | 4/2002 | Kao | |

(Continued)

*Primary Examiner* — Vijay B Chawan
(74) *Attorney, Agent, or Firm* — Christopher M. Scherer; DeWitt LLP

(57) ABSTRACT

Methods, systems, and computer readable media for automated transcription model adaptation includes obtaining audio data from a plurality of audio files. The audio data is transcribed to produce at least one audio file transcription which represents a plurality of transcription alternatives for each audio file. Speech analytics are applied to each audio file transcription. A best transcription is selected from the plurality of transcription alternatives for each audio file. Statistics from the selected best transcription are calculated. An adapted model is created from the calculated statistics.

20 Claims, 4 Drawing Sheets

Related U.S. Application Data continuation of application No. 14/291,893, filed on May 30, 2014, now Pat. No. 9,633,650.

(60) Provisional application No. 61/870,842, filed on Aug. 28, 2013, provisional application No. 61/870,843, filed on Aug. 28, 2013.

(56) References Cited

U.S. PATENT DOCUMENTS

| | | | |
|---|---|---|---|
| 6,766,294 B2 * | 7/2004 | MacGinite | G10L 15/01 |
| | | | 704/235 |
| 6,839,669 B1 * | 1/2005 | Gould | G10L 15/22 |
| | | | 704/E15.04 |
| 7,092,888 B1 * | 8/2006 | McCarthy | G10L 15/063 |
| | | | 704/277 |
| 7,574,358 B2 * | 8/2009 | Deligne | G10L 15/18 |
| | | | 704/251 |
| 7,818,175 B2 * | 10/2010 | Carus | G10L 15/22 |
| | | | 704/235 |
| 8,306,819 B2 * | 11/2012 | Liu | G10L 15/065 |
| | | | 704/251 |
| 8,775,174 B2 | 7/2014 | Conejero | |
| 10,460,215 B2 * | 10/2019 | Herold | G10L 15/22 |
| 10,467,510 B2 * | 11/2019 | Albadawi | G10L 15/28 |
| 10,496,905 B2 * | 12/2019 | Solomon | H04N 7/181 |
| 10,957,311 B2 * | 3/2021 | Solomon | H04N 21/42203 |
| 10,970,768 B2 * | 4/2021 | Zheng | G06V 30/40 |
| 10,978,059 B2 * | 4/2021 | Moreno | G10L 15/02 |
| 2004/0088162 A1 * | 5/2004 | He | G10L 15/063 |
| | | | 704/235 |
| 2006/0026003 A1 * | 2/2006 | Carus | G10L 15/01 |
| | | | 704/E15.04 |
| 2006/0149558 A1 * | 7/2006 | Kahn | G10L 15/063 |
| | | | 704/278 |
| 2006/0229878 A1 * | 10/2006 | Scheirer | G10L 25/48 |
| | | | 704/E11.002 |
| 2009/0248416 A1 * | 10/2009 | Gorin | G10L 15/1822 |
| | | | 704/E15.018 |
| 2010/0094618 A1 * | 4/2010 | Zimmerman | G16H 10/60 |
| | | | 704/235 |
| 2010/0179803 A1 * | 7/2010 | Sawaf | G06F 40/40 |
| | | | 704/E15.003 |
| 2010/0250240 A1 * | 9/2010 | Shu | G10L 15/187 |
| | | | 704/10 |
| 2011/0320197 A1 * | 12/2011 | Con | G06F 16/61 |
| | | | 704/E15.044 |
| 2012/0203720 A1 * | 8/2012 | Baker | G06K 9/6256 |
| | | | 706/12 |
| 2013/0238329 A1 * | 9/2013 | Casella dos Santos | G16H 15/00 |
| | | | 704/235 |

* cited by examiner

SYSTEM AND METHOD OF AUTOMATED MODEL ADAPTATION

CROSS-REFERENCE TO RELATED APPLICATION

The present application claims priority of U.S. Provisional Patent Application Nos. 61/870,842 and 61/870,843, both of which were filed on Aug. 28, 2013, the contents of which are hereby incorporated herein by reference in their entireties.

BACKGROUND

Automated transcription of audio data uses at least one model, that when applied to the audio data, to interpret the audio data into phonemes or words. Models can be acoustic models that match particular words, letters, or phonemes to the signals in audio data that correspond to these structures. Models may further be linguistic models that include a dictionary of words combined with statistics on the frequency of expected occurrences of the words in the dictionaries. Acoustic and/or linguistic models may vary depending upon a particular field of localized setting. Such settings may be based upon a specialized field such as technology, medicine, or law, or may be a geographic location or region.

Currently, the creation of these locally adaptive models is expensive and time consuming as these models rely upon manual transcriptions in order to ensure that the transcription is correct and then these manually transcribed customer service interactions can be extrapolated into adapted models.

BRIEF DISCLOSURE

An exemplary embodiment of a method of automated transcription model adaptation includes obtaining audio data from a plurality of audio files. The audio data is transcribed to produce at least one audio file transcription for each of the audio files. Each audio file transcription represents a plurality of transcription alternatives for each audio file. A best transcription is selected from the plurality of transcription alternatives of each audio file. Statistics are calculated from the selected best transcription of each audio file. An adapted model is created from the calculated statistics.

An exemplary embodiment of a system for automated adaptation of a transcription model includes an audio data source upon which a plurality of audio data files are stored. The processor receives the plurality of audio data files that applies the transcription model to the plurality of audio data files to produce a transcription of the plurality of audio data files. A non-transient computer readable medium is communicatively connected to the processor and programmed with computer readable code that when executed by the processor causes the processor to apply a speech analytic to each transcription of the plurality of audio data files. The processor selects a best transcription from the plurality of transcription alternatives of each audio data file. Statistics are calculated from the selected best transcription of each audio data file. The transcription model is modified based upon the calculated statistics.

An exemplary embodiment of a non-transient computer readable medium is programmed with computer readable code that upon execution by a computer processor causes the computer processor to carry our functions. The computer processor obtains audio data from a plurality of audio files. The audio data is transcribes to produce at least one audio file transcription from each of the audio files. Each audio file transcription represents a plurality of transcriptional alternatives for each audio file. The processor applies speech analytics to each audio file transcription. The processor selects a best transcription from the plurality of transcription alternatives of each audio file. The processor calculates statistics from the selected best transcription of each audio file. The processor creates and adapted model from the calculated statistics.

DETAILED DISCLOSURE

Systems and methods as disclosed herein are directed to the automated generation of adapted models. In embodiments, the systems and methods as disclosed herein are directed to the automated generation of language models modeling the speech of customers in customer service interactions.

The accuracy of an automated transcription of audio data can be improved through the use of one or more models that are tailored to or reflect one or more of the subjects in the audio data. In the exemplary embodiment of a customer service call center, the audio data is a recording or a stream of a customer service interaction between a customer service agent and a customer. In many cases the customer service interaction will pertain to specific technology, complaints, customer services, or other issues that are related to the produces or services offered by a company. In a merely exemplary embodiment, a company in the cellular communications business may have customer service interactions related to particular devices (e.g. cell phones), customer complaints (e.g. billing dispute), or specific customer service activity (e.g. add, modify, or cancel service). A model may be created to reflect these topics or specialized vocabulary related to these topics that arise in the customer service interactions greater than these topics or vocabulary arise in a generalized model of speech communication. In another embodiment, a customer service call center may specifically focus on interactions with customers from a particular country or region and those customers may use a distinct vocabulary (e.g. language or dialect) in customer service interactions.

Figure 1:
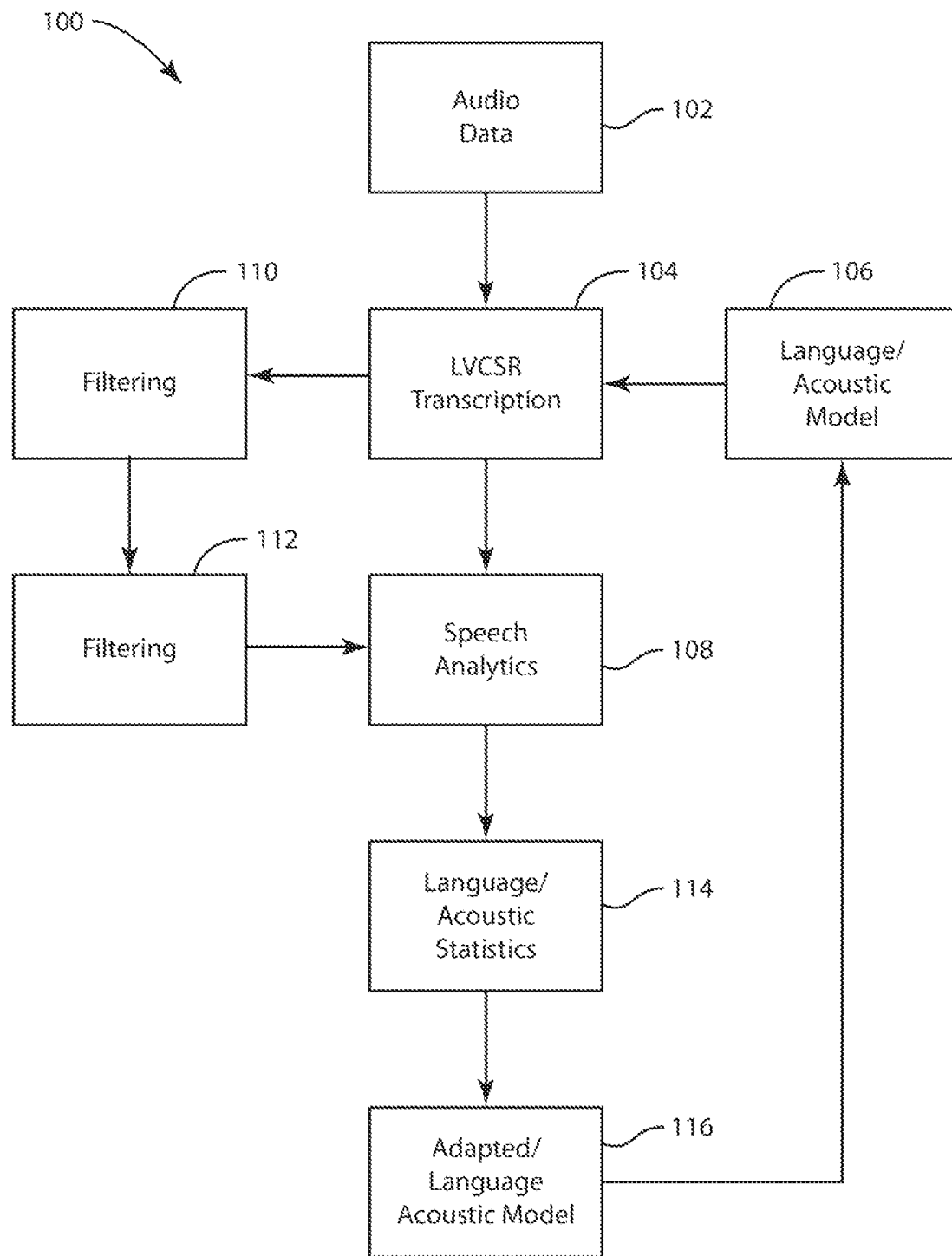
FIG. 1 is a flowchart that depicts an exemplary embodiment of a method of automated model adaptation.

FIG. 1 is a flowchart that depicts an exemplary embodiment of a method 100 of automated model adaptation. In the method 100 at 102 audio data is received. In an exemplary embodiment, the audio data may be recorded audio data from a plurality of customer service interactions between a customer service agent and a customer. However, it is understood that the recorded audio data is not limited to customer service interactions and may come from a variety of other sources. The audio data may exemplarily be recorded as a .WAV file and be recorded in mono audio format. In an exemplary embodiment as described in further detail herein, the audio data may comprise in excess of 1,000 hours of audio data acquired as a plurality of customer service interactions. These customer service interactions may occur and be recorded in parallel such that a plurality of customer service interactions are ongoing at any one time, exemplarily at a customer service call center. However, it will be recognized that in alternative embodiments other temporal amounts of audio data may be used, and this example is in no way intended to be limiting on the scope of the present disclosure.

The audio data received at 102 undergoes automated transcription, exemplarily a large vocabulary continuous speech recognition (LVCSR) transcription at 104. While not depicted in FIG. 1, it is understood that the audio data received at 102 may also undergo various forms of pre-processing prior to LVCSR transcription at 104. Such pre-processing may include segmentation, exemplarily with a voice activity detector (VAD) in order to segment the audio data into a series of utterances, which are segments of audio data that are likely to be speech separated by segments of audio data that are likely to be non-speech segments.

The plurality of utterances are provided to an LVCSR transcription decoder for transcription at 104. In an exemplary embodiment, an LVCSR decoder can operate by applying one or more acoustic models or language models to the audio data segmented into utterances. In such embodiment, the LVCSR decoder receives one or more language/acoustic models 106 for use in the LVCSR transcription at 104. In an exemplary embodiment, the model received at 106 may be a compiled model, compiled from various source models, including but not limited to acoustic, language, dictionary, and grammar models. In exemplary embodiments as disclosed herein, the language/acoustic model 106 may be a generalized language or acoustic model representative of the distribution of phonemes, words, word pairs, word triplets, or other phrases in speech while in other embodiments, the language/acoustic model 106 may be specialized for distribution of phonemes, words, and terms in a specific industry, technical, or scientific field, or specific to a language or a dialect, or expected in the received audio data.

Given an input that represents the spoken utterance, the simplest output format of an LVCSR transcription at 104 is a sequence of recognized words, along with word boundaries. Such an output format may be referred to as one-best output as the transcription selects the most likely transcription based upon the applied models. For example, the start and end time-stamp of each output word can be determined. In a non-limiting embodiment this may be performed using the Viterbi algorithm as described in Viterbi A. J., "Error bounds for convolutional codes and an asymptotically optimum decoding algorithm". *IEEE Transactions on Information Theory* 13(2): 260-269 (1967), which is hereby incorporated by reference in its entirety. However, in recognition of the complexity and uncertainly in the outputs in the embodiments disclosed in greater detail herein, an output format that represents alternative (N-best) outputs is provided.

Figure 4:
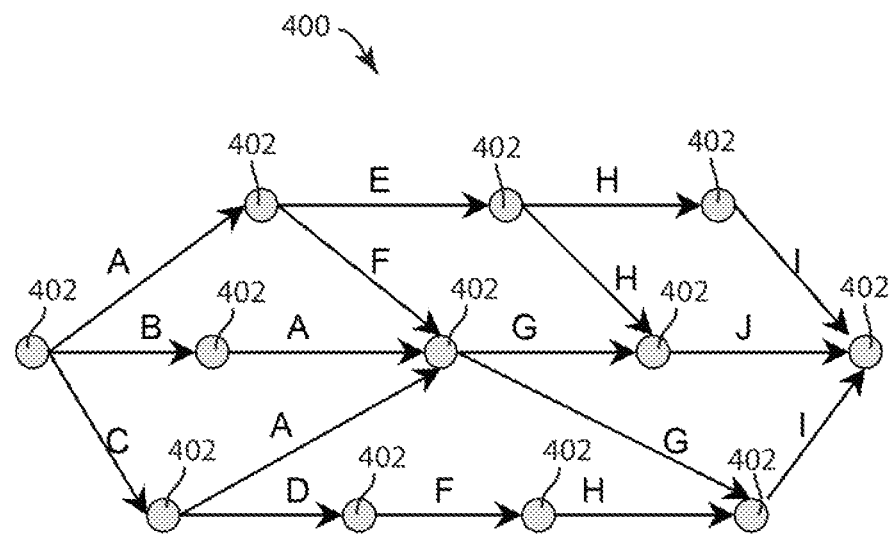
FIG. 4 depicts an exemplary embodiment of a word lattice output from an automated transcription.

As disclosed herein, the Viterbi algorithm as used in the LVCSR transcription at 104 is modified such that it outputs a plurality of word lattices. The word lattice may be used as the transcription output from the LVCSR transcription of 104 and provided for speech analytics at 108. A word lattice is a weighted and directed graph whose nodes are associated with time stamps and whose arcs are labeled with output words, where the weight of each arc is the log-likelihood of the corresponding word. FIG. 4 depicts a non-limiting exemplary embodiment of a word lattice exemplarily output from the LVCSR transcription at 104. The positions of the nodes 402 represent the order of those nodes 402 along the time axis. Each of the letters (A-I) represent words in the possible transcription.

The word lattices output at 104 may be used for representing alternative outputs in a manner that minimizes sentence error rate. In an alternative embodiment, it is possible to convert the word lattice to an alternative format of a confusion network that rather minimizes the word error rate of the LVCSR transcription 104. This may exemplarily be performed using a minimum Bayes risk decoder. There are several methods for converting a word lattice to a confusion network. One embodiment of which is described by Xu H., Povey D., Mangu L., Zhu J. "Minimum Bayes Risk decoding and system combination based on a recursion for edit distance," Computer Speech & Language 25(4): 802-828 (2011), which is hereby incorporated by reference in its entirety. In such an embodiment, the word sequence is extracted along the best path in the lattice. This path is padded with epsilon symbols (e.g. the path becomes $\varepsilon_1$, $W_1$, $\varepsilon_1$, $W_2$, $\varepsilon$ ... $W_N$, $\varepsilon$). The path is recursively aligned with the rest of lattice paths. This results in a confusion network that contains 2n+1 bins, denoted $B_0$, $B$, ..., $B_{2n}$, where the most probable arcs of the bins with odd indices (namely $B_1$, $B_3$, ...) are labeled with non-epsilon arcs, and the most probable arcs of the bins with even indices (namely $B_0$, $B_2$ ...) have $\varepsilon$-labels; we refer to these bins as $\varepsilon$-bins.

Figure 5:
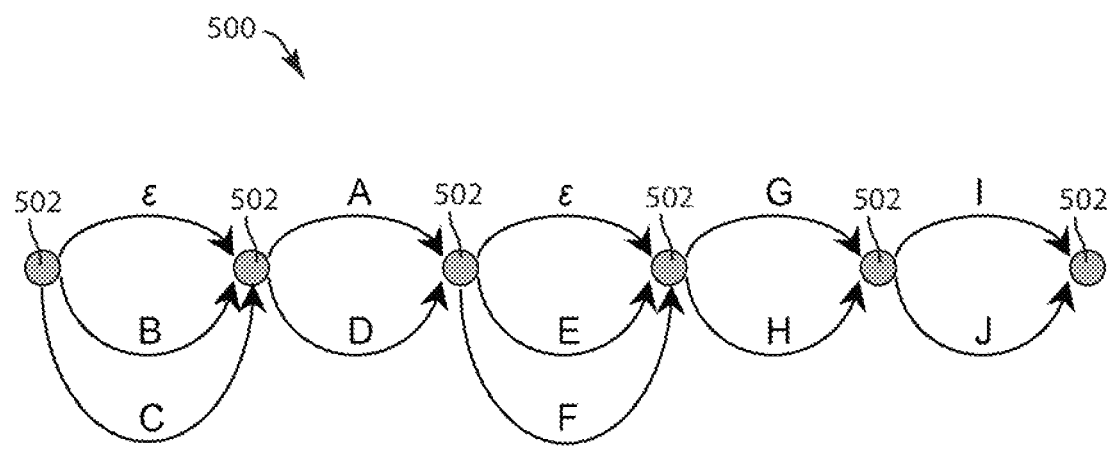
FIG. 5 depicts an exemplary embodiment of a confusion network derived from at least one word lattice.

FIG. 5 depicts a non-limiting exemplary embodiment of a confusion network 500 constructed exemplarily from the word lattice 400 depicted in FIG. 4. A confusion network is a linear sequence of nodes 502, which are associated with average time-stamps, such that a confusion-network arc may only connect two consecutive nodes 502. For this reason, the network arcs can be grouped into bins, where the arcs of a single bin represent the various word alternatives for the relevant time segment. The confusion-network arcs are weighted by probability values, where the probabilities of the arcs over a single bin sum up to 1. The confusion network may further be thought of as the weighted average of all word alternatives encoded in the lattice. To make this averaging possible, it is necessary to allow $\varepsilon$-labels in the confusion network, namely to allow for arcs that are not associated with output words.

Both of the exemplarily outputs from the LVCSR transcription at 104 of a word lattice or a confusion network represent outputs that convey multiple or alternative interpretations of the LVCSR transcription, notably, the N-best potential transcriptions.

These N-best transcriptions in the form of a word lattice or confusion network undergo speech analytics at 108 in order to select the best path out of the N-best transcriptions based upon additional context going through the speech analytics.

In speech analytics key words, terms, or phrases are identified in the transcriptions and changes in the probabilities of various word options in the word lattice or confusion network are modified based upon the identified words, terms, or phrases. While the language/acoustic models applied in the LVCSR transcription may seek to identify adjacent words in the form of word pairs or word triplets, speech analytics at 108 may identify broader context in the transcription that increases or decreases the probabilities of various words in the transcriptions that are further apart. In a merely exemplary embodiment, the word "question" may be identified in the transcription which may later increase the probability that a word in the confusion network transcript is "ask" rather than "task" or "mask." In a further merely exemplary embodiment, if the word "weather" is identified in the transcription, this may increase the probability that a word in the confusion network transcript is "sunny" rather than "funny" or "runny", all of which may appear acoustically similar, and may have similar likelihoods in an exemplary language model. Out of the speech analytics at 108 a best path through the word lattice or confusion network is selected as the correct transcription. This best path is processed at 114 to calculate language/acoustic statistics from the identified best path.

It is to be recognized that in embodiments, one or both of language statistics and acoustic statistics may be calculated at 114. Language statistic calculations at 114 may be a statistical analysis of the occurrences of individual words, word pairs, word triplets, or long phrases or scripts in a linguistic analysis of the best path transcription. Acoustic statistic calculations at 114 may be statistical analysis of occurrences of individual, doublet, or triplet phonemes. In an embodiment, new words or phonemes that appear in the language/acoustic statistics may be identified for addition into a dictionary or grammar which may be used as a component in constructing other transcription models.

The language/acoustic statistics from 114 are then used to construct an adaptive language/acoustic model at 116. It is further to be recognized that in embodiments one or both of adapted language models and acoustic models may be created at 116. The adapted language/acoustic model can be constructed by adapting a generalized language or acoustic model to reflect the specific statistics identified at 114 which are more representative of the language or acoustics experienced in the customer service interactions handled at the customer service call center. In an embodiment, this adapted language/acoustic model from 114 can be used as the language/acoustic model 106 used in future transcriptions of audio data.

While the above description of a method of automated model adaptation 100 is presented with respect to audio data of a single customer service interaction, it is to be recognized that in order to create a robust adapted language or acoustic model at 116, embodiments may alternatively analyze and use audio data from a plurality of customer service interactions. As noted above in a non-limiting example, the audio data may, in a merely exemplary embodiment, be in excess of 1,000 hours of customer service interaction audio data. In some such embodiments, it may be desirable to filter the audio data in order to focus the analysis resulting in model adaptation to only high quality audio data. In an embodiment, this may be performed by filtering the audio data, exemplarily at 110. It is to be noted that while the filtering at 110 is exemplarily provided on the output from the LVCSR transcription, it is to be recognized that in alternative embodiments the audio data may be filtered at another point in the method 100 prior to calculating the language/acoustic statistics at 114. In a non-limiting embodiment, the output LCVSR transcriptions from 104 may be filtered by evaluating each LVCSR transcription to calculate a transcription quality score as disclosed in further detail herein, particularly with respect to FIG. 3. The transcription quality score may be an index or value representative of an automated evaluation of the transcription quality. In filtering the transcriptions provided by the LVCSR transcription at 104, only those transcriptions with a pre-determined transcription quality score may be selected for further processing. In one embodiment, a transcription quality score is a normalized score on a scale of 0-100 that is representative of the quality of the transcription.

In an embodiment, the filtering at 110 may be on a customer service interaction by customer service interaction basis as a transcription score as disclosed in greater detail herein can be calculated for an entire transcription of an audio file. In a further embodiment, the transcriptions selected as being high quality overall transcriptions may be further filtered on an utterance by utterance basis to select only the highest quality transcribed utterances from the highest quality customer service interaction transcriptions for use in constructing the adaptive language/acoustic models at 116. Embodiments of the filtering at 110 may exemplarily include an automated evaluation of transcription quality, exemplarily as described further herein with respect to FIG. 3. As described in further detail herein, the transcription quality score can alternatively be calculated on an utterance by utterance basis as well.

In a still further embodiment, the processing of the audio data 102 may further include diarization at 112. It is further to be noted that while the present disclosure specifically incorporates the diarization into the method 100 after filtering the LVCSR transcriptions to select the highest quality transcriptions for continued processing, it will be recognized that, in alternative embodiments, diarization may be conducted at a variety of points in the method while remaining within the scope of the present disclosure. In non-limiting embodiments, the audio data from 102 may be diarized before an LVCSR transcription is performed at 104. It is to be noted, however, that in some embodiments it may be preferred that the diarization be performed prior to the speech analytics at 108, as the diarization itself may further provide additional context to facilitate in the speech analytics and selection of the best path in the output word lattices or confusion networks. In the diarization, exemplarily provided at 112, the transcription or audio data is separated into at least two clusters, each cluster associated with a separate speaker in the customer service interaction. The continuing example of a customer service call center and a recorded customer service interaction, the audio data is likely to have two speakers, namely a customer and an agent, and the diarization process separates and attributes the speech in the audio data or transcriptions between these two parties. However, it will be recognized that in some embodiments or instances, more than two speakers may exist, and the diarization may further serve to separate the audio data into more than two clusters, each cluster representative of one of multiple speakers in the audio data.

In embodiments wherein the transcriptions are diarized, independent of when in the method such diarization takes place, the language/acoustic statistics calculated at 114 and adaptive language/acoustic models at 116 may be performed separately for each of the speakers, exemplarily for the agent and for the customer. In such embodiments, customer service agent may exhibit particular language or acoustical features in customer service interactions such that an acoustic or linguistic model directed towards agents may more accurately interpret the agent path of the customer service interaction. Similarly, the phrasing, intonation, or topics commonly stated by customers may enable for more accurate LVCSR transcriptions when the language and acoustic statistics are from the customer sides of the customer service interactions independent from the agent sides.

In a still further exemplary embodiment, in the context of a customer service call center, over time a large temporal volume of audio data may be acquired for each individual customer service agent. As a customer service agent will be a party to each of customer service interactions handled by that customer service agent during the course of a day, week, or month as a customer service agent. Therefore, if the audio data is tagged, labeled, or otherwise indicated as being associated with a particular customer service agent, those transcriptions may be filtered to select only the transcriptions of a particular customer service agent to undergo the language/acoustic statistics at 114 and to construct an adaptive language/acoustic model at 116 that is individually tailored to a specific customer service agent. Therefore, in future instances of automated transcription, when an identification of the customer service agent is known, one or more of a language or acoustic model representative of that customer service agent may be used in transcribing the customer service agent's portion of the customer service interaction.

The method 100 generally represents a single iteration of a method 100 of automated language model adaptation. In an embodiment, the method 100 may be applied in an iterative fashion to regularly update and modify a language model used for transcription of audio data. In such an embodiment, an adaptive language model may be constructed periodically, exemplarily every day, two days, week, or other time interval in order to continually update the language model to reflect the language experienced in customer service interactions. This can create a system that is sensitive to changes in the frequency of words used during the life cycle of a system. Exemplarily, the introduction of a new product may result in new topics in customer service interactions and a regularly updated language model may reflect these new customer service trends. In one exemplary embodiment, on an initial implementation, a generalized language model may be used for the LVCSR transcriptions. Once a first adaptive language model is constructed in the manner as described above, that adaptive language model will be used for subsequent LVCSR transcriptions until a next adaptive language model is constructed from the subsequent customer service interactions. In another exemplary embodiment, an entirely new adaptive language model is constructed with each iteration of the method, while in an alternative embodiment each subsequent adaptive language model is constructed by updating the previous adaptive language model such that previous adaptations are not lost, but the model continues to reflect current trends in customer service interaction.

Figure 2:
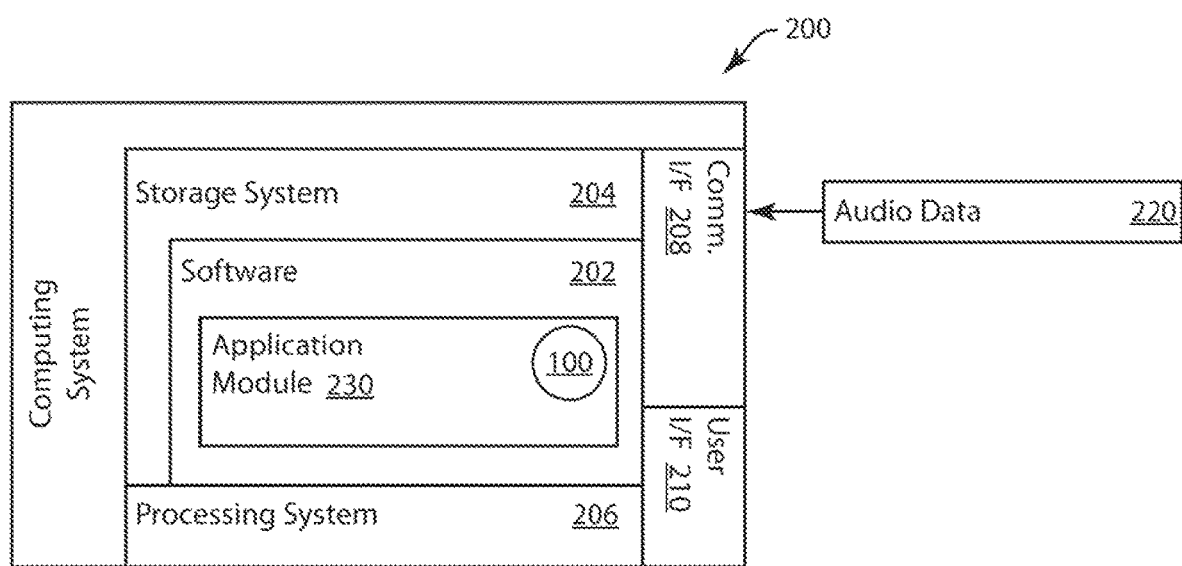
FIG. 2 is a system diagram of an exemplary embodiment of a system for automated model adaptation.

FIG. 2 is a system diagram of an exemplary embodiment of a system 200 for automated model adaptation. The system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in further detail herein in accordance with the method 100 and may further operate as described herein with respect to the method 300.

Although the computing system 200 as depicted in FIG. 2 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can comprise a microprocessor and other circuitry that retrieves and executes software 202 from storage system 204. Processing system 206 can be implemented within a single processing device but can also be distributed across multiple processing devices or subsystems that cooperate in existing program instructions. Examples of processing system 206 include general purpose central processing units, application specific processors, and logic devices, as well as any other type of processing device, combinations of processing devices, or variations thereof.

The storage system 204 can comprise any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable, of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 210.

As described in further detail herein, the computing system 200 receives and transmits data through the communication interface 208. In embodiments, the communication interface 208 operates to send and/or receive data to/from other devices to which the computing system is communicatively connected. In the computing system 200, audio data 220 is received at the communication interface 208. The audio data 220 may exemplarily be an audio recording of a conversation or customer service interaction, which may exemplarily be between two speakers, although the audio recording may be any of a variety of other audio records, including multiple speakers, a single speaker, or an automated or recorded auditory message. The audio file may exemplarily be a .WAV file, but may also be other types of audio files, exemplarily in a pulse code modulated (PCM) format and an example may include linear pulse code modulated (LPCM) audio data. Furthermore, the audio data is exemplarily mono audio data; however, it is recognized that embodiments of the method as disclosed herein may also be used with stereo audio data. In still further embodiments, the audio data 200 may be streaming audio data received in real time or near-real time by the computing system 200. As described above, the computing system 200 operates to automatedly adapt a model to the language or acoustics of the audio data to produce an adapted model 240.

Figure 3:
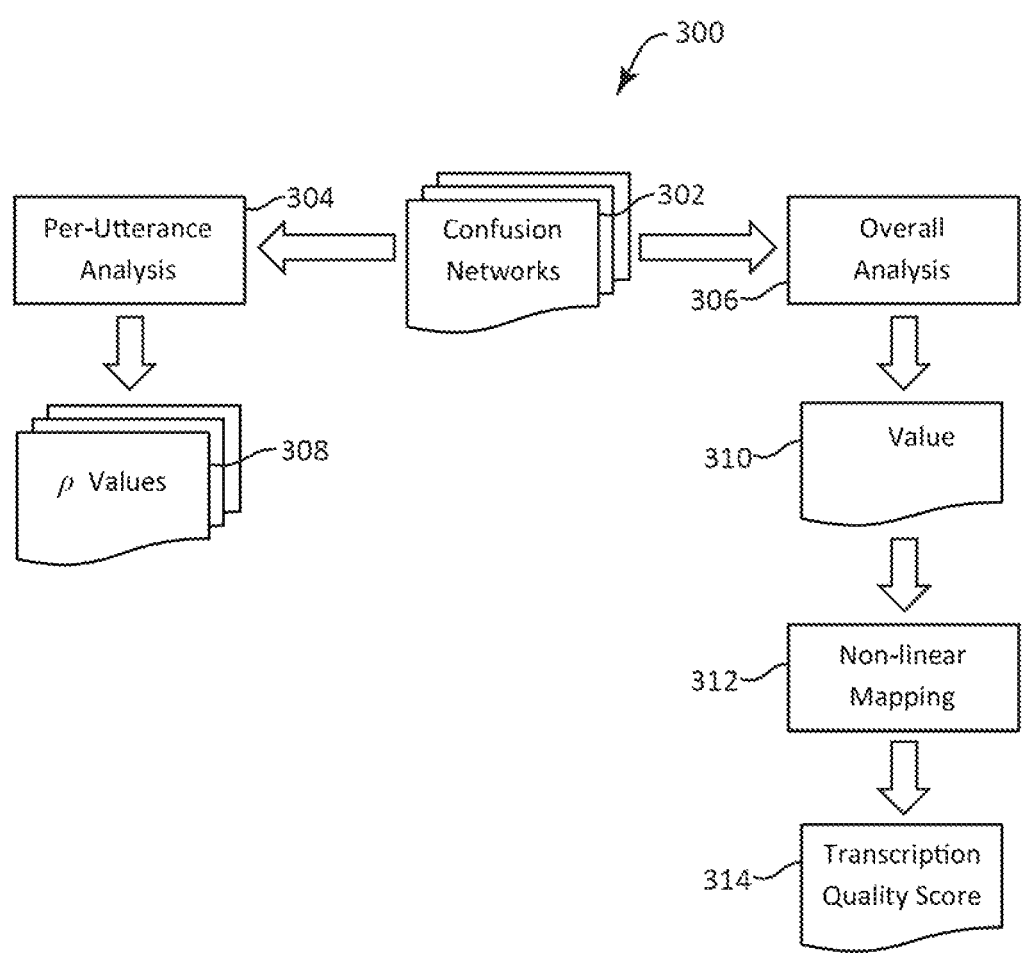
FIG. 3 is a flowchart that depicts an exemplary embodiment of a method of automated transcription and evaluation of transcription quality.

FIG. 3 is a flowchart that depicts an exemplary embodiment of a method 300 of automated evaluation of transcription quality as may be performed as a part of the filtering at 110 in the method 100 described above with respect to FIG. 1.

In an embodiment, an overall accuracy of the LVCSR output can be estimated from the confusion-network probabilities 302. In an example wherein both acoustic and linguistic models used in the LVCSR are a good fit, the majority of the word bins contain a single word whose probability is high (close to 1), and their adjacent s-bins contain only a single arc with the s-label, which naturally has probability of 1. On the other hand, in an example wherein the audio has poor conformity to the acoustic model, or the spoken utterances have poor conformity to the language model, the LVCSR output becomes more uncertain, and the confusion network will contain more alternatives. As the result becomes more uncertain, the expected probability of the most probable word in the word bins will be smaller and, the probability of non-epsilon arcs in the s-bins increases.

The LVCSR output confusion networks 302 can be evaluated on a per-utterance basis at 304 or to provide an overall analysis of the transcription at 306. Exemplarily as described with respect to 308, a plurality of $\rho$ values representative of the quality of a per-utterance conformity can be calculated as described herein. A quality score representative of the quality of the conformity of the LVCSR models to the audio data can be derived based on the above-noted characteristics of the confusion network. Given a confusion network, let $p_k$ be the probability of the most probable arc in the kth bin. In computing $\rho$ the joint probability of each ε-bin and the word bin that precedes it are considered. $\rho$ can be computed from the following ratio:

$$\rho = \frac{1}{n} \cdot \sum_{j=1}^{n} p_{2j-1} \cdot p_{2j}$$

Starting at 306, the confusion network from 302 can be used to perform an overall analysis of a transcription. Given a confusion network that represents the LVCSR output for a specific speech utterance, it is possible to compute the value of $\rho$ in order to evaluate the quality of the overall transcription. Moreover, in an embodiment wherein a conversation that comprises a sequence of M utterances is transcribed, the average $\rho$ value over all utterances can be computed at 310. Let $n^{(i)}$ be the number of words in the best path of the ith utterance and let $p_k^{(i)}$ be the probability of the best alternative in the kth bin of the confusion matrix for this utterance, the equation becomes:

$$\hat{\rho} = \frac{\sum_{i=1}^{M} \sum_{j=1}^{n^{(i)}} p_{2j-1}^{(i)} \cdot p_{2j}^{(i)}}{\sum_{i=1}^{M} n^{(i)}}$$

It is possible to map at 312 either value to a transcription quality score 314, which is exemplarily a number between 0 and 100, which gives an initial evaluation for the LVSCR accuracy for the conversation, without actually having a manual transcription serving as the comparison basis. To this end, we use a non-linear mapping of $\hat{\rho}$, can be used, exemplarily a sigmoid:

$$S(x) = \left[ 100 \cdot \frac{1}{1 + e^{-\sigma \cdot (x - \mu)}} \right]$$

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of automated transcription model adaptation for a particular customer service agent, the method comprising:
    obtaining audio data from a plurality of audio files;
    applying at least one applied model to the audio data;
    creating at least one audio file transcription of the audio data for each of the audio files, wherein each audio file transcription represents a one-best output transcription of each audio file based on the application of the at least one applied model;
    filtering the at least one audio file transcription for each audio file to select each audio file transcription for the particular customer service agent;
    assigning each selected audio file transcription a transcription quality score;
    comparing the transcription quality score for each selected audio file transcription to a transcription quality threshold;
    processing each selected audio file transcription in which the transcription quality score is greater than the transcription quality threshold to calculate statistics from each processed audio file transcription; and
    creating a specific agent adapted model from the calculated statistics for the particular customer service agent.

2. The method of claim 1, the method further comprising pre-processing the audio data before transcription to segment the audio data into a plurality of segmented utterances.

3. The method of claim 2, wherein the segmented utterances are segments of audio data that are likely to be speech separated by segments of audio data that are likely to be non-speech.

4. The method of claim 1, wherein the one-best output transcription is the most likely transcription based on the applied model.

5. The method of claim 1, wherein the creation of the at least one audio file transcription includes:
applying a large vocabulary continuous speech recognition system to the audio data for each audio file;
creating a word lattice for the audio data of each audio file; and
applying the at least one applied model to the word lattice for each audio file to determine the one-best output transcription.

6. The method of claim 5, wherein the continuous speech recognition system applies contextual statistics to the word lattice for each audio file.

7. The method of claim 1, the method further comprising:
diarizing each of the selected audio file transcriptions prior to processing each selected audio file transcriptions to identify at least a first speaker and a second speaker in each selected audio file transcription;
determining which of the identified speakers is likely to be the particular customer service agent; and
processing just the diarized selected audio file transcripts determined to likely belong to the particular customer service agent to calculate the statistics for each audio file transcription.

8. A system for automated adaptation of a transcription model for a particular customer service agent, the system comprising:
an audio data source upon which a plurality of audio data files are stored;
a processor that:
receives the plurality of audio data files,
applies at least one applied model to the segmented utterances,
creates an audio file transcription of each of the plurality of audio data files, wherein each audio data file transcription represents a one-best output transcription of each audio file based on the application of the at least one applied model,
filters the at least one audio file transcription for each audio file to select each audio file transcription for the particular customer service agent,
assigns each selected audio file transcription a transcription quality score,
compares the transcription quality score for each selected audio file transcription to a transcription quality threshold; and
a non-transitory computer readable medium communicatively connected to the processor and programmed with computer readable code that when executed by the processor causes the processor to:
process each selected audio file transcription in which the transcription quality score is greater than the transcription quality threshold to calculate statistics from each processed audio file transcription, and
create a specific agent adapted model from the calculated statistics for the particular customer service agent.

9. The system of claim 8, wherein the processor further pre-processes the audio data before transcription to segment the audio data into a plurality of segmented utterances.

10. The system of claim 9, wherein the segmented utterances are segments of audio data that are likely to be speech separated by segments of audio data that are likely to be non-speech.

11. The system of claim 8, wherein the one-best output transcription is the most likely transcription based on the applied model.

12. The system of claim 8, wherein the creation of the at least one audio file transcription includes:
applying a large vocabulary continuous speech recognition system to the audio data for each audio file;
creating a word lattice for the audio data of each audio file; and
applying the at least one applied model to the word lattice for each audio file to determine the one-best output transcription.

13. The system of claim 12, wherein the continuous speech recognition system applies contextual statistics to the word lattice for each audio file.

14. The method of claim 8, wherein the processor is further instructed to:
diarize each of the selected audio file transcriptions prior to processing each selected audio file transcriptions to identify at least a first speaker and a second speaker in each selected audio file transcription;
determine which of the identified speakers is likely to be the particular customer service agent; and
process just the diarized selected audio file transcripts determined to likely belong to the particular customer service agent to calculate the statistics for each audio file transcription.

15. A non-transitory computer readable medium programmed with computer readable code that upon execution by a computer processor causes the computer processor to:
obtain audio data from a plurality of audio files;
apply at least one applied model to the audio data;
create at least one audio file transcription of the audio data for each of the audio files, wherein each audio file transcription represents a one-best output transcription of each audio file based on the application of the at least one applied model;
filter the at least one audio file transcription for each audio file to select each audio file transcription for a particular customer service agent;
assign each selected audio file transcription a transcription quality score;
compare the transcription quality score for each selected audio file transcription to a transcription quality threshold;
process each selected audio file transcription in which the transcription quality score is greater than the transcription quality threshold to calculate statistics from each processed audio file transcription; and
create a specific agent adapted model from the calculated statistics for the particular customer service agent.

16. The non-transitory computer readable medium of claim 15, wherein the processor is further instructed to: pre-process the audio data before transcription to segment the audio data into a plurality of segmented utterances.

17. The non-transitory computer readable medium of claim 16, wherein the segmented utterances are segments of audio data that are likely to be speech separated by segments of audio data that are likely to be non-speech.

18. The non-transitory computer readable medium of claim 15, wherein the one-best output transcription is the most likely transcription based on the applied model.

19. The non-transitory computer readable medium of claim 15, wherein the creation of the at least one audio file transcription includes:
- applying a large vocabulary continuous speech recognition system to the audio data for each audio file;
- creating a word lattice for the audio data of each audio file; and
- applying the at least one applied model to the word lattice for each audio file to determine the one-best output transcription.

20. The non-transitory computer readable medium of claim 19, wherein the continuous speech recognition system applies contextual statistics to the word lattice for each audio file.

* * * * *